United States Patent
Steinbock

(10) Patent No.: US 6,957,889 B1
(45) Date of Patent: Oct. 25, 2005

(54) RAY SCREENING VISOR FOR SPECTACLE LENSES

(76) Inventor: William J. Steinbock, 3803 Buchanan, McHenry, IL (US) 60050

( * ) Notice: Subject to any disclaimer, the term of this patent is extended or adjusted under 35 U.S.C. 154(b) by 0 days.

(21) Appl. No.: 10/319,113

(22) Filed: Dec. 13, 2002

(51) Int. Cl.$^7$ .................................................. G02C 7/16
(52) U.S. Cl. ........................................... 351/45; 351/46
(58) Field of Search ............................ 351/45, 46, 47, 351/48, 57, 58, 44, 41, 158; 2/15, 12, 13

(56) References Cited

U.S. PATENT DOCUMENTS

| | | | |
|---|---|---|---|
| 3,664,733 A | * | 5/1972 | Kalkowski .................... 351/45 |
| 4,781,451 A | | 11/1988 | McAllen |
| 4,924,526 A | | 5/1990 | Parissenti |
| 4,955,707 A | | 9/1990 | Gazeley |
| 5,005,214 A | | 4/1991 | Koethe |
| 5,080,688 A | | 1/1992 | Cohen |
| 5,258,786 A | | 11/1993 | Penrod |
| 5,335,025 A | | 8/1994 | Wang |
| 5,438,378 A | * | 8/1995 | Blatter ........................ 351/47 |
| 5,619,287 A | | 4/1997 | Tseng |
| 5,818,565 A | | 10/1998 | Wang |
| 5,835,182 A | | 11/1998 | Einarsson |
| 5,991,072 A | | 11/1999 | Solyntjes et al. |
| 6,062,689 A | | 5/2000 | Harper |
| 6,196,676 B1 | | 3/2001 | Tabacchi |

* cited by examiner

*Primary Examiner*—Hung Xuan Dang
(74) *Attorney, Agent, or Firm*—Meroni & Meroni, P.C.; Charles F. Meroni, Jr.; Paul D. Pressley

(57) ABSTRACT

Spectacles having a ray shading visor preventing light rays from contacting an upper portion of the lens. The spectacles comprise at least one temple piece and at least one lens of predetermined thickness connected to the temple piece having an inner face, an outer face, and a center point centrally located on the outer face of the lens. A receiving structure integrally formed within the lens receives the ray shading visor. The visor structure is non-translucent and has an outer surface arcuately extending outwardly from the outer face of the lens toward the center point of the lens. An inner surface of the visor is shaped to matingly rest adjacent the outer face of the fens. The visor has a fastening structure integrally formed with the non-translucent visor and is sized and shaped to be matingly connected to the receiving structure of the lens.

19 Claims, 6 Drawing Sheets

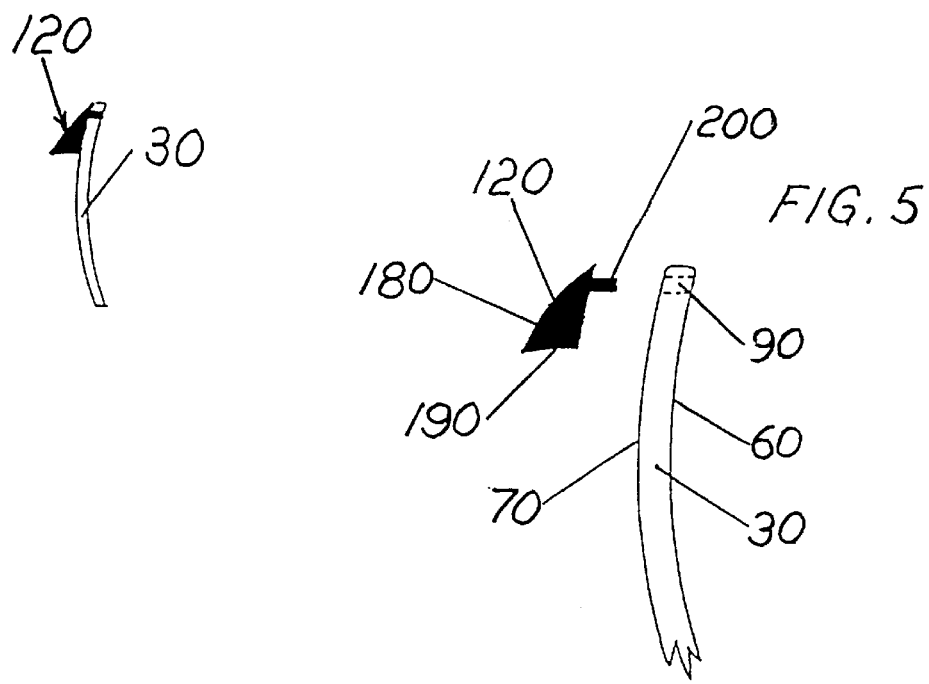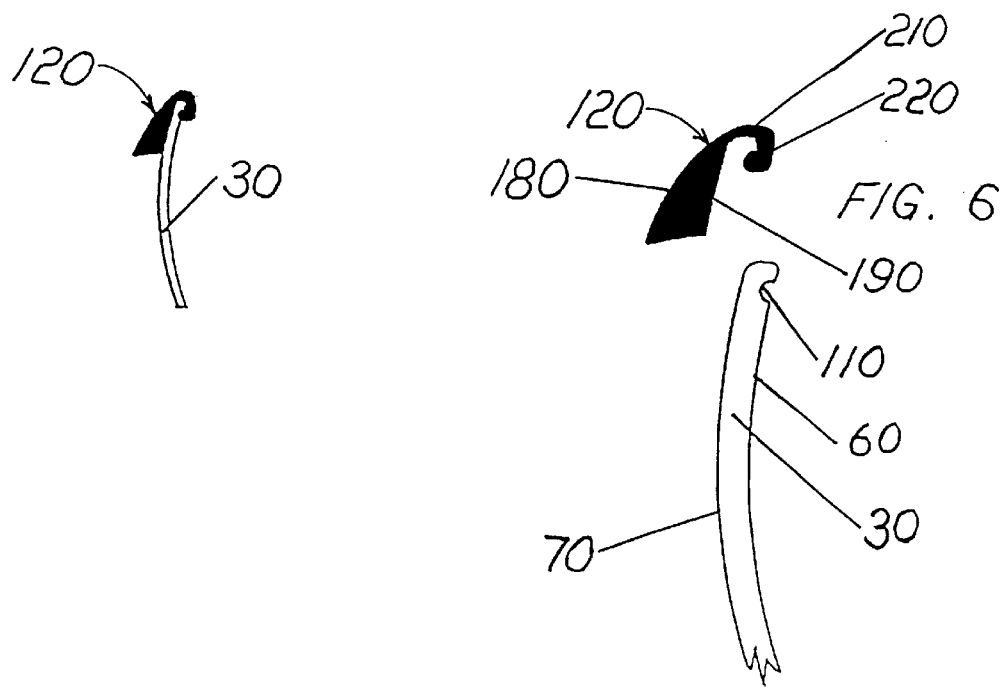

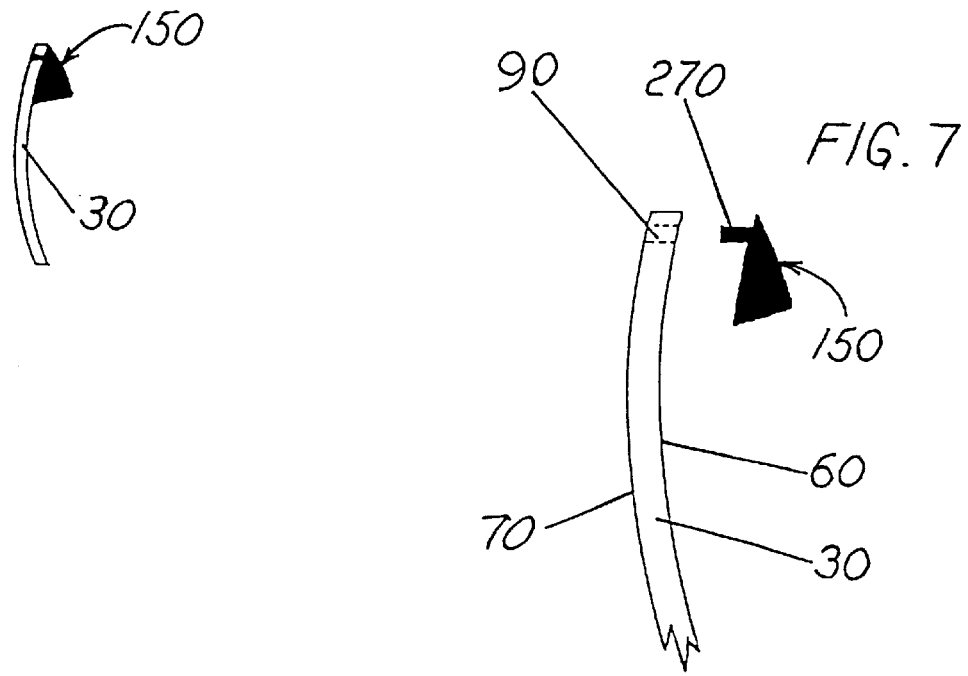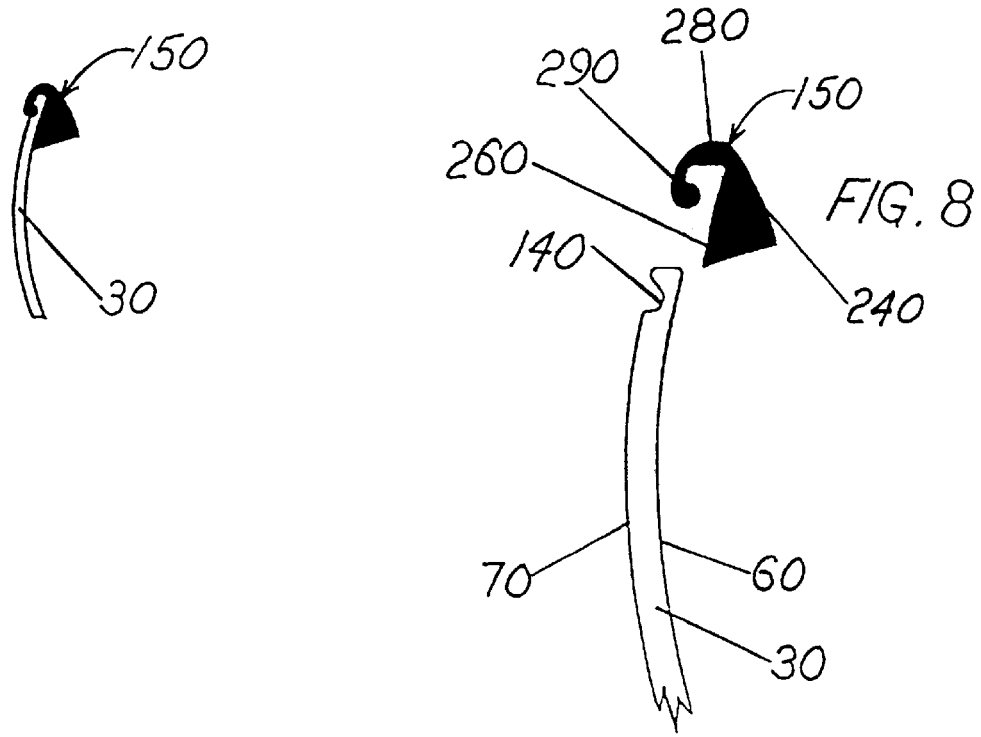

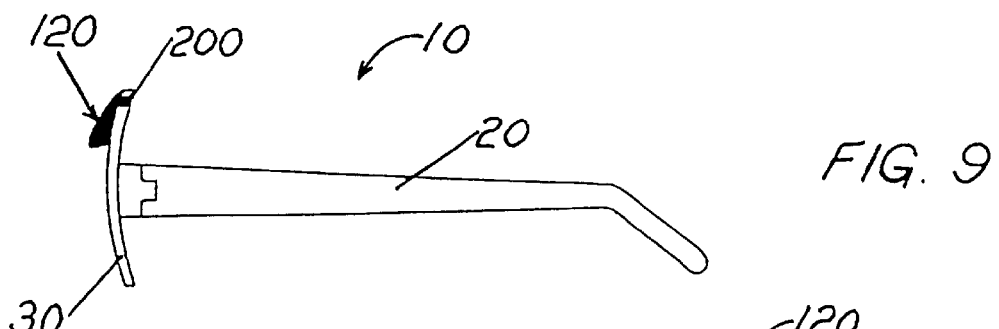
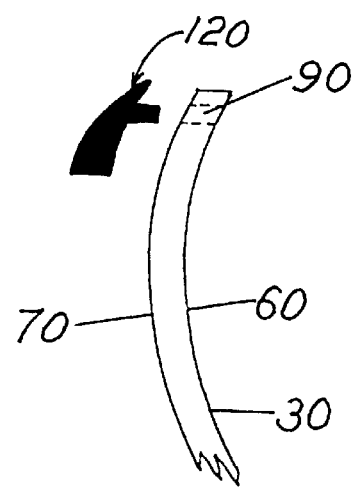
FIG. 9
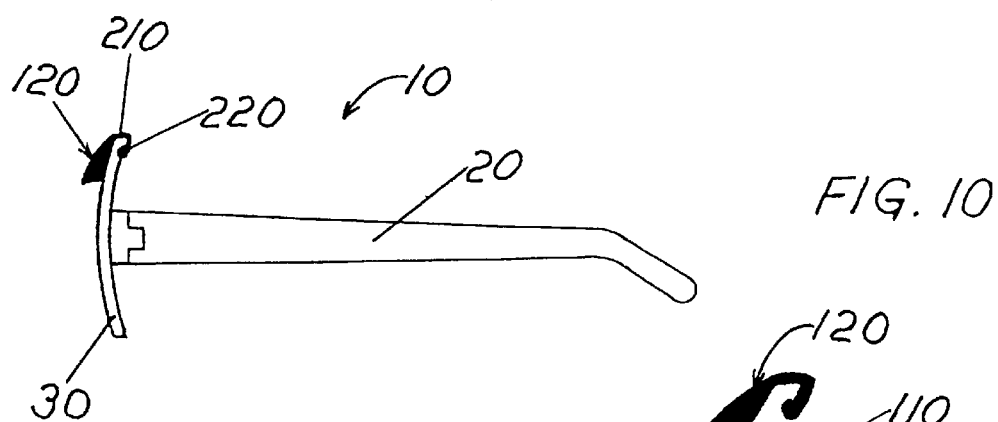
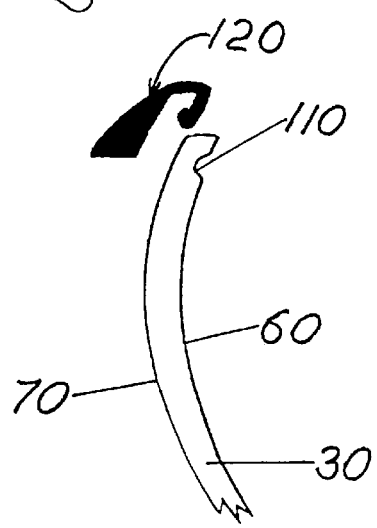
FIG. 10

RAY SCREENING VISOR FOR SPECTACLE LENSES

BACKGROUND OF THE INVENTION

1. Field of the Invention

The present invention generally relates to spectacles. More specifically, the present invention relates to ray screening visors for spectacle lenses.

2. Description of the Prior Art

For many years people have been seeking more effective ways of preventing sun or other types of light from interfering with their vision when wearing spectacles. In general, there have been two different approaches to blocking or shading light from interfering with a person's vision when wearing a pair of spectacles. In one approach, people have modified spectacle frames to block or shade light from entering the spectacle lenses by presenting opaque barriers between the spectacle lenses and undesirable light entering the lenses. The following previously issued United States Patents disclose several of these devices.

U.S. Pat. No. 5,005,214 issued to Koethe discloses an elongated, generally strip-like shade visor device that is removably attachable to the front frame section of a pair of eyeglasses to shade the wearer's eyes from overhead glare.

U.S. Patent No. 5,258,786 issued to Penrod discloses a visor apparatus for attachment to a pair of eyeglasses. The apparatus has tow main parts, including a clip means which attaches to a pair of eyeglasses and a visor portion which is pivotally attached to the clip means.

U.S. Pat. No. 5,335,025 issued to Wang discloses a sunshade and sunglasses which may be interchageably detachably attached to vision correcting eye glasses is provided. The attachment is made by way of flexigrip-catch pairs. A pair of flexigrips are integrally formed on the top of an eyeglass frame for correcting lenses and are adapted for being received by a first pair of catches that are integrally formed on the top of a frame of a pair of sunglasses which has no temples, or a second pair of catches fixedly positioned underneath a sunshade.

U.S. Pat. No. 5,619,287 issued to Tseng discloses a pair of eyeglasses with a sunshade having a sunshade releasably combined with a frame and a plate glass also collapsibly combined with the frame, the sunshade and the plate glass being replaceable to be combined with the frame according to the taste of a user.

U.S. Pat. No. 5,818,565 issued to Wang discloses an eyeglass structure includes an eyeglass frame defining two rims each receiving and holding therein a lens. Each of the rims has a recessed notch defined by two opposite side walls spaced from each other with a pivot pin extending from one of the side walls to substantially midway of the spacing between the side walls. A sunshade has two projections, each having a through hole through which each of the pivot pins extends so as to allow the sunshade to be substantially normal to the lenses to block sun light coming from above the eyeglass structure and a stowed position wherein the sunshade is adjacent to and substantially cover the lenses to protect and block light coming from the front side from incidence onto the lenses.

These visor type devices are generally effective but typically require spectacle frames having upper retaining structure to be employed. Therefor, there is a need for an effective way to block or shade undesirable light from interacting with a person's eyes when the person is wearing a pair of spectacles without an upper retaining frame structure.

As a second approach, people have filtered light entering spectacle lenses to block or shade the light so that the light interacting with the eye does not interfere with comfortable viewing through the spectacle lenses. The following previously issued United States Patents are representative of this approach.

U.S. Pat. No. 5,080,688 issued to Cohen discloses a lens that reduces eye strain and fatigue due to glare. The lens includes a light transmitting plastic body having a convex shaped outer surface for deflecting stray angular radiation and a body provide, in combination with, an ultraviolet absorber to block the transmission of ultraviolet radiation, a colored dye to diminish the intensity of any fluorescent light incident upon the lens and to diminish the transmission of either or both green color radiation or yellow color radiation through the lens and a grey dye to reduce the transmission of incident light.

U.S. Pat. No. 5,991,072 issued to Solyntjes discloses a lens film used to filter visible, infrared, and ultraviolet light. The lens film has one or more metallized layers stacked together. Each metallized layer has a substrate with a metal coating covering one face of the substrate.

This approach to blocking or shading light from interfering with comfortable viewing through spectacle lenses is also generally effective is certain situations. However, there are applications where filtering light from interacting with the spectacle wearer's eyes is not acceptable. Therefore, there is a need for a way to block or shade undesirable light from interacting with a person's eyes when filtering the lenses of a pair of spectacles without an upper retaining frame structure is not acceptable.

SUMMARY OF THE INVENTION

A primary object of the claimed invention is to provide a ray shading visor to block unwanted light from entering the lenses of a pair of spectacles.

Another object of the claimed invention is to provide an exterior ray shading visor that may be connected to the lenses of a pair of spectacles.

A further object of the claimed invention is to provide an interior ray shading visor that may be connected to the lenses of a pair of spectacles.

To solve the long felt need for a spectacle visor not dependent upon the spectacle frame having an upper retaining structure and to achieve the objects of the invention, the claimed invention provides a ray shading visor preventing light rays from contacting an upper portion of the lenses. The spectacles having ray shading visors generally comprise a temple piece, a lens, a receiving structure, and a visor structure.

The spectacles comprise at least one temple piece and at least one lens of predetermined thickness connected to the temple piece. The lens has an inner face, an outer face, and a center point centrally located on the outer face of the lens.

The receiving structure is integrally formed within the lens to receive the ray shading visor and may take several different forms in different embodiments of the invention. The receiving structure can be an aperture through the thickness of the lens that is sized and shaped to receive the welding posts of the visors that employ sonic welding to attach the visors to the lenses. The receiving structure also can be an indentation within the inner or outer face of the lens for those exterior visors that employ a clipping arm to attach the exterior visor to the lens.

The exterior visor embodiment of the invention is preferably made of non-translucent plastic to block light rays from entering the portion of the lens where the visor is attached and a portion of the lens immediately adjacent the exterior visor. The outer surface is arcuately shaped so that it extends outwardly from the outer face of the lens toward the center point of the lens. The inner surface of the visor is shaped to matingly rest adjacent the outer face of the lens.

The exterior visor has a fastening structure integrally formed with the exterior visor that is sized and shaped to be matingly connected to the receiving structure of the lens. The fastening structure can be a post sized and shaped for sonic welding within the aperture of the lens. The fastening structure may also be a clip having an arm portion sized and shaped to extend across the thickness of the lens. The clipping portion is sized and shaped to fit within the indentation securing the exterior visor to the lens.

The interior visor embodiment of the invention is preferably made of non-translucent plastic to block light rays from entering the portion of the lens where the visor is attached and a portion of the lens immediately adjacent the interior visor. The inner surface is arcuately shaped so that it extends outwardly from the inner face of the lens toward the center point of the lens. The outer surface of the visor is shaped to matingly rest adjacent the inner face of the lens.

The interior visor has a fastening structure integrally formed with the interior visor that is sized and shaped to be matingly connected to the receiving structure of the lens. The fastening structure may be a post sized and shaped for sonic welding within the aperture of the lens or may be a clip having an arm portion sized and shaped to extend across the thickness of the lens. The clipping portion is sized and shaped to fit within the indentation receiving structure securing the interior visor to the lens.

BRIEF DESCRIPTION OF THE DRAWINGS

| | |
|---|---|
| FIG. 1. |
FIG. 5 shows a cross sectional view of a lens with the exterior visor having a post for sonically welding the visor to the lens. |
| FIG. 6. |
FIG. 6 shows a cross sectional view of a lens with the exterior visor having a clip for clipping the visor to the lens. |
| FIG. 7. |
FIG. 7 shows a cross sectional view of a lens with the interior visor having a post for sonically welding the visor to the lens. |
| FIG. 8. |
FIG. 8 shows a cross sectional view of a lens with the interior visor having a clip for clipping the visor to the lens. |
| FIG. 9. |
FIG. 9 shows a side view of a pair of spectacles with the exterior visor having a post for sonically welding the visor to the spectacles. |
| FIG. 10. |
FIG. 10 shows a side view of a pair of spectacles with the exterior visor having a clip for clipping the visor to the spectacles. |
| FIG. 11. |

DETAILED DESCRIPTION OF THE PREFERRED EMBODIMENT

Figure 1:
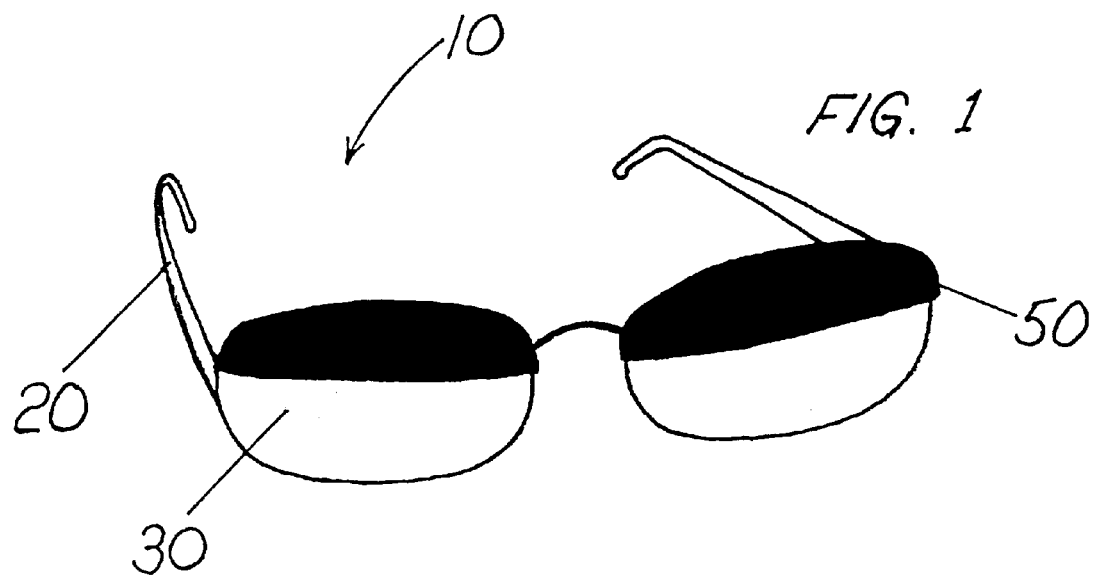
FIG. 1 shows a perspective view of a pair of spectacles with the exterior visor. |
| FIG. 2. |
Figure 3:
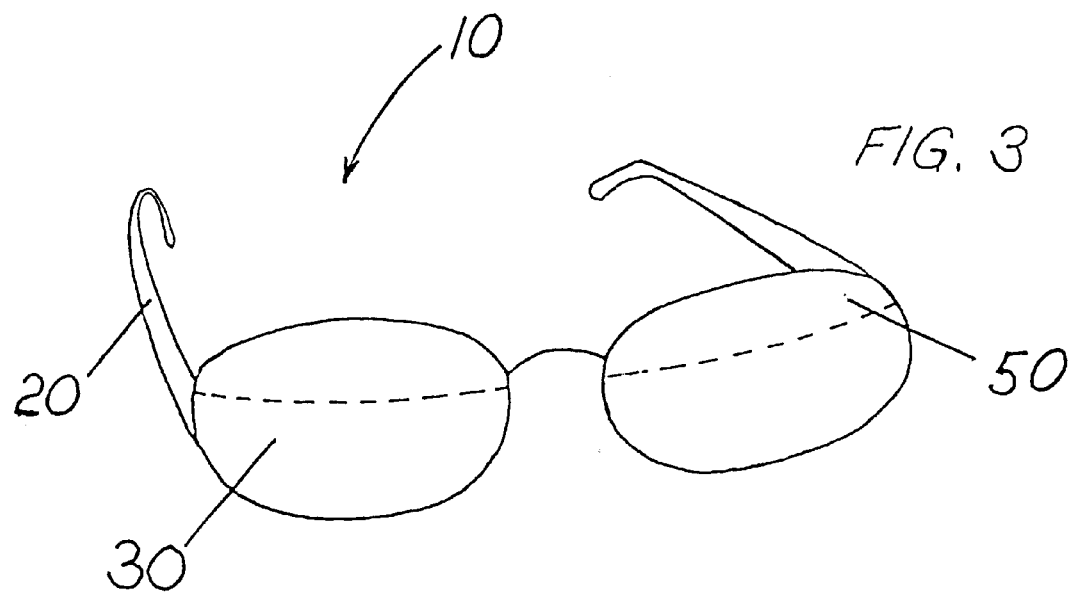
FIG. 3 shows a perspective view of a pair of spectacles with the interior visor. |
| FIG. 4. |

Turning now to the drawings FIGS. 1 and 3 show a pair of spectacles having a ray shading visor 10 preventing light rays from contacting an upper portion of the lenses. The spectacles having ray shading visors 10 generally comprise a temple piece 20, a lens 30, a receiving structure, and a visor structure 50.

The spectacles 10 comprise at least one temple piece 20 and at least one lens 30 of predetermined thickness connected to the temple piece 20. The lens 30 has an inner face 60, an outer face 70, and a center point 80 centrally located on the outer face 70 of the lens 30.

The receiving structure is integrally formed within the lens 30 to receive the ray shading visor and may take several different forms in different embodiments of the invention. The receiving structure shown in FIGS. 5 and 7 is an aperture 90 through the thickness of the lens 30 that is sized and shaped to receive the welding posts of the visors that employ sonic welding to attach the visors to the lenses. The receiving structure shown in FIG. 6 is an indentation 110 within the inner face 60 of the lens 30 for those exterior visors 120 that employ a clip 130 to attach the exterior visor 120 to the lens 30. The receiving structure shown in FIG. 8 is an indentation 140 within the outer face 70 of the lens 30 for those interior visors 150 that employ a clipping arm 160 to attach the interior visor 150 to the lens 30. The visor structure 50 may also be adhered to the outer face 70 of the lens 30.

Figure 2:
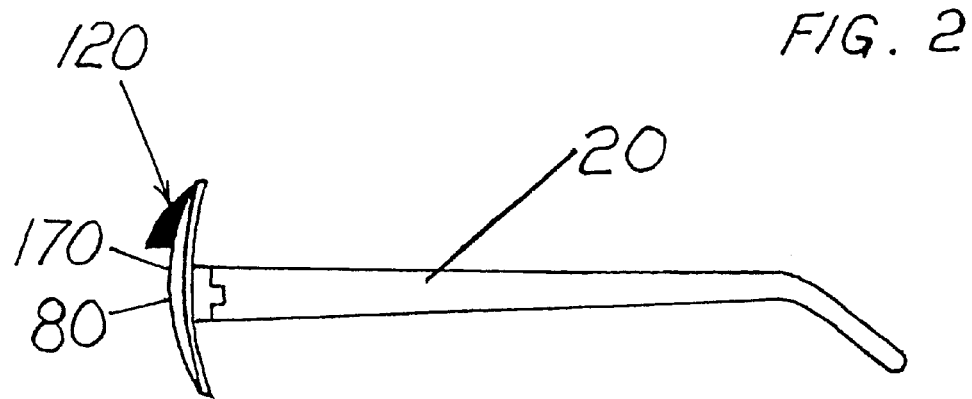
FIG. 2 shows a side view of a pair of spectacles with the exterior visor. |
| FIG. 3. |

The exterior visor 120 embodiment of the invention shown in FIGS. 1 and 2 is attached to the lens 30 with the fastening structures shown in FIGS. 5–6 and 9–10. The exterior visor 120 is preferably made of non-translucent plastic such as ABS or polycarbonate to block light rays from entering the portion of the lens where the visor is attached and a portion 170 of the lens immediately adjacent the exterior visor 120. The outer surface 180 is arcuately shaped so that it extends outwardly from the outer face 70 of the lens 30 toward the center point 80 of the lens 30 as shown in FIG. 2. The inner surface 190 of the exterior visor 120 is shaped to matingly rest adjacent the outer face 70 of the lens 30.

The exterior visor 120 has a fastening structure integrally formed with the exterior visor that is sized and shaped to be matingly connected to the receiving structure of the lens 30. The fastening structure shown in FIG. 5 is a weld post 200 sized and shaped for sonic welding within the aperture 90 of the lens 30. The fastening structure shown in FIG. 6 is a clip 130 having an arm portion 210 sized and shaped to extend across the thickness of the lens 30. The clipping portion 220 is sized and shaped to fit within the indentation 110 securing the exterior visor 120 to the lens 30. The arm portion 210 and the clipping portion 220 flex as the exterior visor 120 is attached to the lens 30 of the spectacles 10. FIGS. 9 and 10 show the spectacles 10 having the exterior visor 120 attached to the lens 30 of the spectacles 10. The gap 215 between the clipping portion and the visor structure 50 is preferably 0.085 inches. This gap is critical to the function of the visor 50 shown in FIG. 10.

Figure 4:
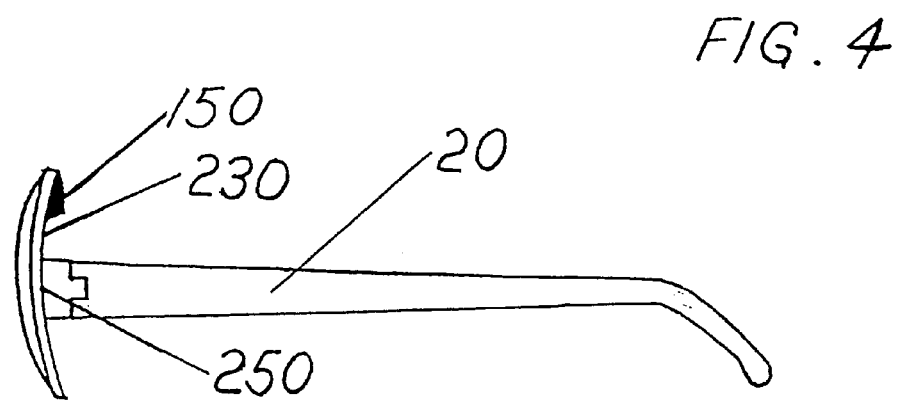
FIG. 4 shows a side view of a pair of spectacles with the interior visor. |
| FIG. 5. |

The interior visor embodiment of the invention 150 shown in FIGS. 3 and 4 is attached to the lens 30 with the fastening structures shown in FIGS. 7–8 and 11–12. The interior visor 150 is preferably made of non-translucent plastic such as ABS or polycarbonate to block light rays from entering the portion of the lens 30 where the interior visor 150 is attached and a portion 230 of the lens 30 immediately adjacent the interior visor 150. The inner surface 240 is arcuately shaped so that it extends outwardly from the inner face 60 of the lens 30 toward the center point 250 of the lens 30 as show in FIG. 4. The outer surface 260 of the interior visor 150 is shaped to matingly rest adjacent the inner face 60 of the lens 30.

Figure 11:
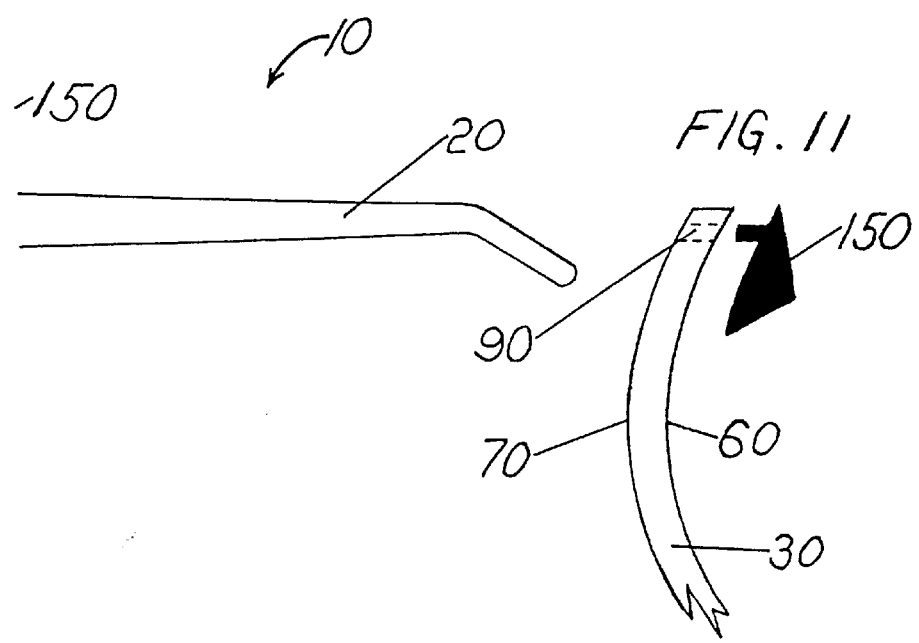
FIG. 11 shows a side view of a pair of spectacles with the interior visor having a post for sonically welding the visor to the spectacles. |
| FIG. 12. |
Figure 12:
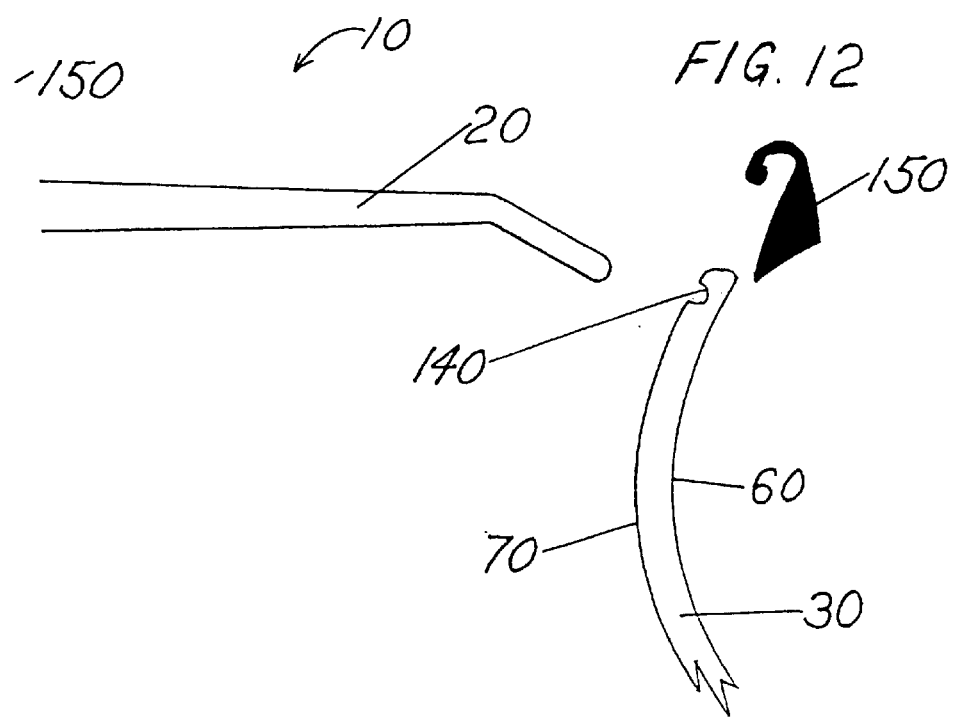
FIG. 12 shows a side view of a pair of spectacles with the interior visor having a clip for clipping the visor to the spectacles. |

The interior visor 150 has a fastening structure integrally formed with the interior visor 150 that is sized and shaped to be matingly connected to the receiving structure of the lens 30. The fastening structure shown in FIG. 7 is a weld post 270 sized and shaped for sonic welding within the aperture 90 of the lens 30. The fastening structure shown in FIG. 8 is a clip having an arm portion 280 sized and shaped to extend across the thickness of the lens 30. The clipping portion 290 sized and shaped to fit within the indentation 140 securing the interior visor 150 to the lens 30. The arm portion 290 and clipping portion 300 flex as the interior visor 150 is attached to the lens 30 of the spectacles 10. FIGS. 11 and 12 show the spectacles 10 having the interior visor 150 attached to the lens 30 of the spectacles 10.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. Spectacles having a ray shading visor, the spectacles comprising:
    at least one temple piece;
    at least one lens of predetermined thickness connected to the temple piece having an inner face, an outer face, and a center point centrally located on the outer face of the lens;
    a receiving structure integrally formed within the lens;
    a non-translucent visor structure having an outer surface arcuately extending outwardly from the outer face of the lens toward the center point of the lens having, an inner surface shaped to matingly rest adjacent the outer face of the lens, the visor preventing light rays from contacting an upper portion of the lens; and
    a fastening structure integrally formed with the non-translucent visor, the fastening structure sized and shaped to be matingly connected to the receiving structure of the lens.

2. The spectacles of claim 1 wherein the receiving structure is an indentation within the inner face of the lens.

3. The spectacles of claim 2 wherein the fastening structure is a clip having an arm portion sized and shaped to extend across the thickness of the lens and a clipping portion sized and shaped to fit within the indentation securing the visor to the spectacles providing a gap between the visor structure and the clipping portion.

4. The spectacles of claim 3 wherein the visor structure is made of synthetic plastic.

5. The spectacles of claim 4 wherein the gap between the visor structure and the clipping portion is 0.085 inches.

6. The spectacles of claim 1 wherein the receiving structure is an aperture through the thickness of the lens.

7. The spectacles of claim 6 wherein the fastening structure is a post sized and shaped for sonic welding within the aperture of the lens securing the visor to the spectacles.

8. Spectacles having a ray shading visor, the spectacles comprising:
    at least one temple piece;
    at least one lens of predetermined thickness connected to the temple piece having an inner face, an outer face, and a center point centrally located on the inner face of the lens;
    a receiving structure integrally formed within the lens;
    a non-translucent visor structure having an outer surface arcuately extending outwardly from the inner face of the lens toward the center point of the lens having, an inner surface shaped to matingly rest adjacent the inner face of the lens, the visor preventing light rays from contacting an upper portion of the lens; and
    a fastening structure integrally formed with the non-translucent visor, the fastening structure sized and shaped to be matingly connected to the receiving structure of the lens.

9. The spectacles of claim 8 wherein the receiving structure is an indentation within the outer face of the lens.

10. The spectacles of claim 9 wherein the fastening structure is a clip having an arm portion sized and shaped to extend across the thickness of the lens and a clipping portion sized and shaped to fit within the indentation securing the visor to the spectacles.

11. The spectacles of claim 10 wherein the receiving structure is an aperture through the thickness of the lens.

12. The spectacles of claim 11 wherein the visor structure is made of synthetic plastic.

13. The spectacles of claim 8 wherein the fastening structure is a post sized and shaped for sonic welding within the aperture of the lens securing the visor to the spectacles.

14. A spectacle lens visor, the visor comprising:
    an opaque body member having an arcuately shaped outer face and a concave inner face shaped to matingly rest against a convex spectacle lens surface, the opaque body preventing light rays from contacting an upper portion of a spectacle lens when fastened to the spectacle lens;
    a clip arm for extending over a top surface of a spectacle lens; and
    a clip portion shaped to sliplessly engage a concave portion of a spectacle lens.

15. The spectacle visor of claim 14 wherein the clip portion flexes away from the opaque body member during attachment of the opaque body member to a spectacle lens.

16. The spectacle visor of claim 15 wherein the opaque body member is made of synthetic plastic.

17. A spectacle lens visor, the visor comprising:
    an opaque body member having a convex shaped outer face to matingly rest against a concave spectacle lens surface and a arcuately shaped inner face, the opaque body preventing light rays from contacting an upper portion of a spectacle lens when fastened to the spectacle lens;
    a clip arm of for extending over a top surface of a spectacle lens; and
    a clip portion shaped to sliplessly engage a convex portion of a spectacle lens.

18. The spectacle visor of claim 17 wherein the clip portion flexes away from the opaque body member during attachment of the opaque body member to a spectacle lens.

19. The spectacle visor of claim 18 wherein the opaque body member is made of synthetic plastic.

* * * * *